United States Patent
Ritschel et al.

(10) Patent No.: US 11,841,494 B2
(45) Date of Patent: Dec. 12, 2023

(54) OPTICAL IMAGING DEVICE FOR A MICROSCOPE

(71) Applicant: Leica Microsystems CMS GmbH, Wetzlar (DE)

(72) Inventors: Kai Ritschel, Heuchelheim (DE); Marco Bingel, Kirchhain (DE); Patric Pelzer, Wetzlar (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 421 days.

(21) Appl. No.: 17/082,320

(22) Filed: Oct. 28, 2020

(65) Prior Publication Data
US 2021/0149175 A1 May 20, 2021

(30) Foreign Application Priority Data
Nov. 15, 2019 (EP) .................................... 19209559

(51) Int. Cl.
G02B 21/36 (2006.01)
G06T 7/80 (2017.01)
G06T 7/37 (2017.01)

(52) U.S. Cl.
CPC ......... *G02B 21/367* (2013.01); *G02B 21/365* (2013.01); *G06T 7/37* (2017.01);
(Continued)

(58) Field of Classification Search
CPC .. G02B 21/365; G02B 21/0024; G02B 21/16; G02B 21/367; G02B 21/008;
(Continued)

(56) References Cited

U.S. PATENT DOCUMENTS 6,191,809 B1 * 2/2001 Hori ...................... H04N 13/122
348/E13.016
7,298,938 B2 * 11/2007 Johnston .............. G06V 30/144
385/25
(Continued)

FOREIGN PATENT DOCUMENTS

EP 2322969 A1 5/2011
EP 2796917 A1 10/2014

OTHER PUBLICATIONS

Flottmann et al., "Correlative light microscopy for high-content screening," Biotechniques, 2013, vol. 243, No. 55, 8 pages.

*Primary Examiner* — Philip P. Dang
(74) *Attorney, Agent, or Firm* — Hodgson Russ LLP (57) ABSTRACT

An optical imaging device for a microscope comprises a first optical system configured to form a first optical image corresponding to a first region of a sample in accordance with a first imaging mode, a second optical system configured to form a second optical image corresponding to a second region of said sample, wherein said first and second regions spatially coincide in a target region of said sample and said first and second imaging modes are different from each other, a memory storing first distortion correction data suitable for correcting a first optical distortion caused by said first optical system in said first optical image, second distortion correction data suitable for correcting a second optical distortion caused by said second optical system in said second optical image, and transformation data suitable for correcting positional misalignment between said first and second optical images, and a processor which is configured to process first image data representing said first optical image based on said first distortion correction data for generating first distortion corrected image data, to process second image data representing said second optical image based on said second distortion correction data for generat-
(Continued)

ing second distortion corrected image data; and to combine said first and second distortion corrected image data based on said transformation data for generating combined image data representing a combined image which corresponds to said target region of said object.

12 Claims, 4 Drawing Sheets

(52) U.S. Cl.
CPC ...... *G06T 7/80* (2017.01); *G06T 2207/10056* (2013.01); *G06T 2207/20221* (2013.01)

(58) Field of Classification Search
CPC .. G02B 21/18; G06T 7/37; G06T 7/80; G06T 2207/10056; G06T 2207/20221; G06T 3/00; G06V 10/225
See application file for complete search history.

(56) References Cited

U.S. PATENT DOCUMENTS

| | | | | |
|---|---|---|---|---|
| 7,768,702 B2* | 8/2010 | Hirose | ............... | H04N 13/239 359/368 |
| 8,193,494 B2* | 6/2012 | Harada | ............... | H01J 37/295 250/397 |
| 8,488,895 B2* | 7/2013 | Muller | ............... | G02B 21/0048 382/128 |
| 8,648,896 B2* | 2/2014 | Takahashi | ............... | A61B 1/042 348/54 |
| 9,291,450 B2* | 3/2016 | Takahashi | ............... | G06V 20/66 |
| 9,295,386 B2* | 3/2016 | Fukuma | ............... | A61B 3/0008 |
| 9,389,409 B2* | 7/2016 | Xia | ............... | G02B 21/367 |
| 9,526,415 B2* | 12/2016 | Fukuma | ............... | A61B 3/0008 |
| 9,551,874 B2* | 1/2017 | Amitai | ............... | G02B 27/145 |
| 9,655,545 B2* | 5/2017 | Ji | ............... | A61B 90/20 |
| 9,704,232 B2* | 7/2017 | Karam | ............... | G06T 7/593 |
| 10,061,111 B2* | 8/2018 | Hillman | ............... | G02B 21/0052 |
| 10,433,733 B2* | 10/2019 | Wang | ............... | A61B 5/14546 |
| 10,992,852 B2* | 4/2021 | Hirano | ............... | G02B 21/025 |
| 10,992,924 B2* | 4/2021 | Wang | ............... | G03B 35/00 |
| 11,348,234 B2* | 5/2022 | Segawa | ............... | A61B 5/4848 |
| 11,510,600 B2* | 11/2022 | Valdes | ............... | A61B 5/1495 |
| 2005/0163398 A1 | 7/2005 | Ioka | | |
| 2009/0252398 A1* | 10/2009 | Luther | ............... | G06T 5/50 382/133 |
| 2011/0284767 A1 | 11/2011 | Wolleschensky et al. | | |
| 2012/0307047 A1 | 12/2012 | Kawashima et al. | | |
| 2015/0046118 A1* | 2/2015 | Pandev | ............... | G03F 7/70641 702/155 |
| 2017/0007113 A1 | 1/2017 | Imamura | | |
| 2018/0017773 A1* | 1/2018 | Tomosugi | ............... | G06T 5/003 |
| 2022/0155213 A1* | 5/2022 | Dezawa | ............... | G01N 29/4427 |
| 2022/0196520 A1* | 6/2022 | Dezawa | ............... | C12Q 3/00 |

* cited by examiner

OPTICAL IMAGING DEVICE FOR A MICROSCOPE

CROSS REFERENCE TO RELATED APPLICATIONS

This application claims priority of European patent application number 19209559.4 filed Nov. 15, 2019, the entire disclosure of which is incorporated by reference herein.

TECHNICAL FIELD

The present disclosure relates to an optical imaging device for a microscope. Further, the disclosure relates to a method for imaging a sample using a microscope and a method for calibrating an optical imaging device for a microscope.

BACKGROUND

In the field of microscopy, a plurality of different imaging modes is used for generating optical images of a sample. Each of these imaging modes has advantages and disadvantages in terms of image quality, spatial resolution, imaging speed, light exposure etc. For instance, whereas confocal imaging enables higher spatial resolution, it has the disadvantageous of a relatively long image acquisition time as the sample has to be scanned point by point for creating the image. In contrast, a wide-field imaging mode is advantageous in terms of time required for image acquisition. However, image resolution may be significantly lower.

Accordingly, there is a need for combining different modes when imaging the same sample. However, as different imaging modes may use different optical paths, it is a challenge to make two images generated in different modes coincide so that a properly combined image can be displayed e.g. on a monitor. In case that a user manually registers or aligns the images, similar image structures are required based on which the registration can be performed. This is a cumbersome task, and a precise image fusion is not possible in many cases.

In the present context, reference is made to document EP 2 322 969 B1 disclosing a microscope including a plurality of observation optical systems which are capable of acquiring images of the same sample in different modes. This microscope allows to fully utilize the individual fields of view of the plurality of observation optical systems, thereby improving working efficiency. However, the afore-mentioned document is not involved in automatically merging images generated by applying different imaging modes into a combined image.

SUMMARY

It is an object of the present disclosure to provide an optical imaging device and a method which are capable to combine images generated in accordance with different imaging modes precisely. Further, it is an object to provide a method for calibrating an optical imaging device for a microscope such that the optical imaging device is enabled to combine images precisely.

The afore-mentioned objects are achieved by the subject-matter of the independent claims. Advantageous embodiments are defined in the dependent claims and the following description.

According to an embodiment, an optical imaging device for a microscope comprises a first optical system configured to form a first optical image corresponding to a first region of a sample in accordance with a first imaging mode, a second optical system configured to form a second optical image corresponding to a second region of the sample, wherein the first and second regions spatially coincide in a target region of the sample and the first and second imaging modes are different from each other. The optical imaging device further comprises a memory storing first distortion correction data suitable for correcting a first optical distortion caused by the first optical system in the first optical image, second distortion correction data suitable for correcting a second optical distortion caused by the second optical system in the second optical image, and transformation data suitable for correcting positional misalignment between the first and second optical images. The optical imaging device further comprises a processor which is configured to process first image data representing the first optical image based on the first distortion correction data for generating first distortion corrected image data. The processor is further configured to process second image data representing the second optical image based on the second distortion correction data for generating the second distortion corrected image data. The processor is configured to combine the first and second distortion corrected image data based on the transformation data for generating combined image data representing a combined image which corresponds to the target region of the object.

The optical imaging device comprises two optical systems wherein each of these optical systems may have an image sensor which is adapted to the specific imaging mode. It is considered that each optical system may cause an optical distortion in the optical image generated by this optical system. The first and second optical systems may use different optical paths for imaging so that the optical distortions induced by the first and second optical systems may be independent of each other. Accordingly, the first and second distortion correction data is not correlated with each other either. The distortion correction data may be independently determined and stored for each optical system during assembly. Typically, the optical distortion induced by the respective optical system represents an aberration causing the image to be blurred or distorted so that a proper alignment of the images would be adversely affected. This is all the more true as the respective optical distortions differ significantly from each other due to the different imaging modes. Any such adverse influence can be avoided by storing the first and second distortion correction data which will automatically be taken into account when merging the first and second optical images to a combined image.

The memory of the optical imaging device further stores transformation data which is suitable for correcting positional misalignment between the first and second optical images. In contrast to the first and second distortion correction data which can be independently determined for each optical system, the transformation data represents data taking into account both optical systems, in particular the positional relationship between the optical systems possibly causing a positional misalignment between the optical images.

The first and second optical systems are used to image first and second regions of the sample, respectively, wherein these regions spatially coincide in a target region of the sample. The first and second regions of the sample may spatially coincide in different ways. For instance, the first and second sample regions may be identical to each other so that the target region itself is identical to the respective regions likewise. Alternatively, one of the sample regions may be completely included in the other region so that the target region is formed by the included sample region. In a further alternative, the first and second regions may partially overlap. In such a case, the target region is formed by an overlapping area which is common to both sample regions.

The optical imaging device may comprise a display unit on which the combined image corresponding to the imaged target region of the sample is displayed. Thus, the user is enabled to observe the target region of the sample based on a synthesized image which benefits from the advantages of both imaging modes.

Preferably, the first imaging mode is a wide-field mode, and the second imaging mode is a confocal imaging mode. A synthesized image which is based on these fundamentally different imaging modes provides image information to the user that extends far beyond standard image information.

In a preferred embodiment, the transformation data represent positional misalignment between a first optical reference image formed by the first optical system in accordance with the first imaging mode and a second optical reference image formed by the second optical system in accordance with the second imaging mode. The optical reference images may be generated using a reference object which is adapted to be properly imaged in both imaging modes. Alternatively, live images generated during the actual imaging process may be used as reference images.

Preferably, a calibration mode is provided in which the processor is configured to generate the transformation data and to store the transformation data in the memory prior to forming the first and second optical images. In this calibration mode, the processor may further be configured to generate the first and second distortion correction data and to store this data in the memory. Preferably, the calibration mode is applied in the manufacturing and assembling process so that the distortion correction data and the transformation data is already stored in the finished product. Accordingly, the user does not need to worry about any calibration. Rather, the user is allowed to fully concentrate on the experiment including sample preparation, adjusting imaging parameters etc.

The processor may be configured to determine correlation data representing a correlation between the first and second optical reference images and to generate the transformation data based on said correlation data. For instance, an algorithm may be applied which determines a correlation coefficient based on an identification of structural features in the images. Based on this information, an iterative optimization procedure may be used to determine a required coordinate transformation.

The positional misalignment represented by the transformation data may comprise translation, rotation, scaling, shearing, mirroring, and/or distortion.

In a preferred embodiment, the processor is configured to update the transformation data and to store the updated transformation data in the memory. By updating the transformation data, the user is enabled to react to changes which occur during the experiment. For instance, changes due to drift, structural modifications, dynamic processes in the sample, etc. can be compensated by redetermining the transformation stored in the memory.

As an example, the processor may be configured to cause the first optical system to generate a sequence of first optical images in accordance with the first imaging mode and to cause the second optical system to generate a sequence of second optical images in accordance with the second imaging mode. For redetermining the transformation, the processor may further be configured to determine a first tracking mark within one of the first optical images and to determine a second tracking mark within one of the second optical images. In such a case, the processor is configured to perform tracking of the first tracking mark and the second tracking mark and to update the transformation data based on said tracking. By automatically defining so-called landmarks in form of the afore-mentioned tracking marks in initial images and by tracking these landmarks over time, it is possible to recalibrate the transformation without having to use a calibration standard in form of the reference object again.

The processor may further be configured to combine the first and second distortion corrected image data based on the transformation data such that one of the first and second optical images is mapped to a reference system defined by the other of said first and second optical images or such that both optical images are mapped to a common reference system. In other words, a coordinate transformation is applied by which the coordinate system of one optical image is transformed into the coordinate system of the other image or the coordinate systems of both optical images are transformed into a new common coordinate system.

The first and second optical systems may be installed in a fixed positional relationship to each other. Preferably, the two different imaging modes are adapted as closely as possible to each other by physically aligning the respective optical elements. Such an alignment allows to minimize the required transformation of the image points. Hence, interferences due to interpolation, rotation etc. may be significantly reduced.

According to another aspect, a method for imaging a sample using a microscope is provided. The imaging method comprises the following steps: forming a first optical image corresponding to a first region of a sample in accordance with a first imaging mode by means of a first optical system; forming a second optical image corresponding to a second region of the sample by means of a second optical system, wherein the first and second regions spatially coincide in a target region of the sample and the first and second imaging modes are different from each other; obtaining first distortion correction data suitable for correcting a first optical distortion caused by the first optical system in the first optical image; obtaining second distortion correction data suitable for correcting a second optical distortion caused by the second optical system in the second optical image; obtaining transformation data suitable for correcting positional misalignment between the first and second optical images; processing first image data representing the first optical image based on the first distortion correction data for generating first distortion corrected image data; processing second image data representing the second optical image based on the second distortion correction data for generating a second distortion corrected image data; and combining the first and second distortion corrected image data based on the transformation data for generating combined image data representing a combined image which corresponds to the target region of the object.

According to another aspect, a method for calibrating an optical imaging device for a microscope is provided, said optical imaging device comprising a first optical system configured to form a first optical image corresponding to a first region of a sample in accordance with a first imaging mode; a second optical system configured to form a second optical image corresponding to a second region of the sample, wherein the first and second regions spatially coincide in a target region of the sample and the first and second imaging modes are different from each other; a processor;

and a memory. The method includes the following calibration steps: obtaining first distortion correction data suitable for correcting a first optical distortion caused by the first optical system in the first optical image; obtaining second distortion correction data suitable for correcting a second optical distortion caused by the second optical system in the optical image; obtaining transformation data suitable for correcting positional misalignment between the first and second optical images; and storing the first distortion correction data, the second distortion correction data and the transformation data in the memory to be accessible by the processor.

The calibration method may be performed in the course of the manufacturing and assembling process so that the assembled product can be provided to the user with the required calibration data already stored therein.

According to a preferred embodiment, a first optical reference image of a reference object is formed by means of the first optical system in accordance with the first imaging mode. A second optical reference image of the reference object is formed by means of the second optical system in accordance with the second imaging mode. The transformation data is determined based on positional misalignment of the first and second reference images. By using a single calibration standard in form of the afore-mentioned reference object, the transformation data can be determined in a simple and reproducible manner. The calibration standard can also be used for determining the first and second distortion correction data.

Just as an example, the reference object may comprise a grid formed by a plurality of spots. The grid is adapted to the first and second optical systems such that each optical system is capable to image at least two of the plurality of spots over a range of available magnifications. Such a grid is used to ensure that the calibration standard contains sufficient structure information to achieve the desired degree of accuracy. In particular, the grid is formed to represent identical structures in both imaging modes. Further, the grid may be imaged with both transmitted light and fluorescence light.

BRIEF DESCRIPTION OF THE DRAWING VIEWS

Hereinafter, specific embodiments are described referring to the drawings, wherein.

DETAILED DESCRIPTION

Figure 1:
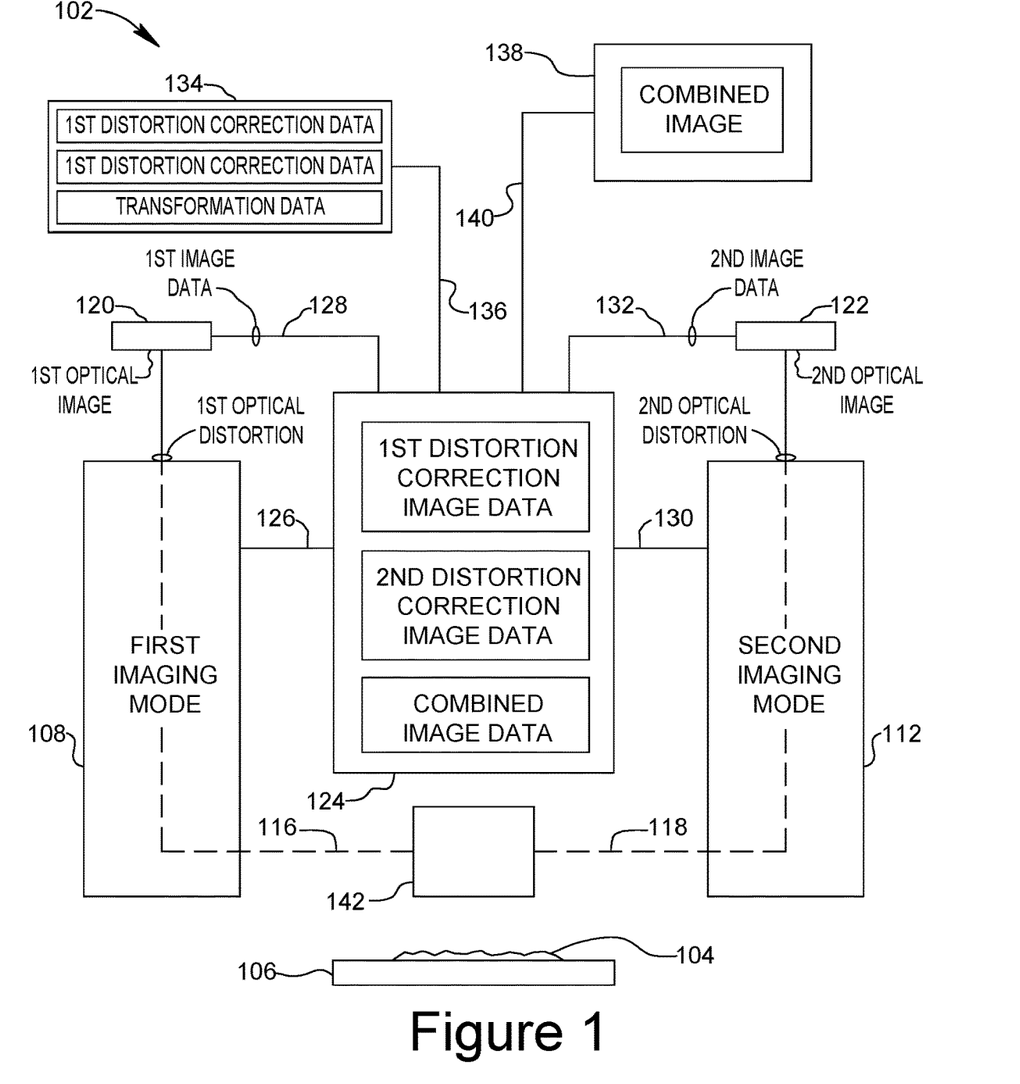
FIG. 1 is a schematic diagram showing an optical imaging device for a microscope according to an embodiment.

FIG. 1 shows a microscope 100 comprising an optical imaging device 102 which is configured to image a sample 104 on a microscope stage 106 in accordance with different imaging modes. For instance, the optical imaging device 102 may serve to image the sample 104 in a wide-field imaging mode and a confocal imaging mode. Needless to say that these imaging modes are to be understood only as examples. Any other modes may be applied as long as these modes are adapted to provide image information which can be sensibly combined for generating a synthesized image.

The optical imaging device 102 comprises a first optical system 108 which is configured to form a first optical image corresponding to a first region 210 (see FIG. 2) of the sample 104 in accordance with a first imaging mode being the wide-field imaging mode in the present embodiment. Likewise, the optical imaging device 102 comprises a second optical system 112 which is configured to form a second optical image corresponding to a second region 214 (see FIG. 2) of the sample 104 in accordance with a second imaging mode being the confocal imaging mode in the present embodiment. As schematically illustrated in FIG. 1, the first and second optical systems 108, 112 use different optical paths 116 and 118, respectively, along which detection light emanating from the sample 104 propagates through the optical system 108, 112 towards image sensors 120, 122 which are coupled to the optical systems 108, 112, respectively. The first image sensor 120 which is assigned to the first optical system 108 may be formed by a camera suitable for wide-field imaging. The second image sensor 122 which is assigned to the second optical system 112 may be formed by a sensor suitable for confocal imaging, e.g. a point detector.

The optical imaging device 102 further comprises a processor 124 which may serve to control the overall operation of the optical imaging device 102. In particular, the processor 124 is configured to process first image data representing a first optical image and second image data representing a second optical image, wherein the first and second optical images are generated on the image sensors 120, 122 by means of the first and second optical systems 108, 112, respectively. For this, the processor 124 is connected to the optical systems 108, 112 and the image sensors 120, 122 via control lines 126, 128, 130, 132.

The optical imaging device further comprises a memory 134 connected to the processor 124 via a control line 136. Further, a display unit 138 may be provided which is connected to the processor 124 via a control line 140.

Furthermore, in order to provide the different optical paths 116, 118 towards the first and second optical systems 108, 112, a beam splitter or any other suitable light deflector 142 may be included in the optical imaging device 102.

Figure 2:
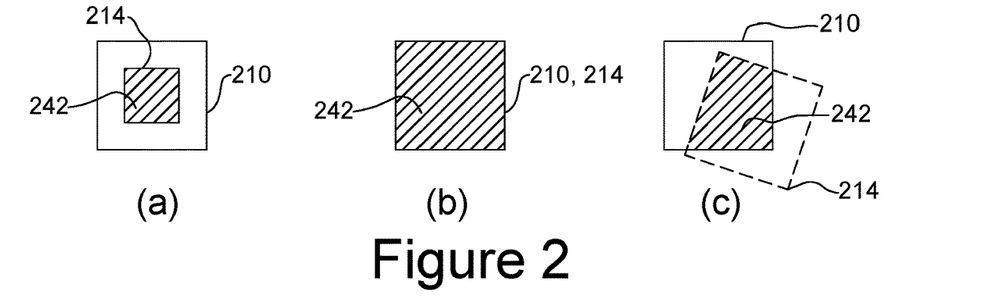
FIG. 2 is a diagram illustrating examples for a positional relationship between first and second regions of a sample to be imaged by the optical imaging device.

As mentioned above, the optical imaging device 102 is able to operate in the wide-field imaging mode and the confocal imaging mode in order to image the first region 210 and the second region 214 of the sample 104. The first and second regions 210, 214 spatially coincide in a target region of the sample 104 which is illustrated by a hatched area 242 in FIG. 2. The spatial coincidence may be realized in different ways. For example, the second region 214 assigned to the confocal imaging mode may be completely included in the first region as shown in FIG. 2(*a*). As the target region 242 is formed by an overlap of the first and second regions 210, 214, the target region 242 is identical to the second region 214 in the example illustrated in FIG. 2(*a*). Further, FIG. 2(*b*) shows an example in which the first and second regions 210, 214 are identical so that the target region 242 is identical to the respective regions likewise. In the example shown in FIG. 2(*c*), the first and second regions 210, 214 partially overlap so that the target region 242 is formed by an overlapping area which is common to both regions 210, 214. Needless to say that the spatial coincidence between the first and second regions 210, 214 is not limited to the examples shown in FIG. 2.

In the embodiment shown in FIG. 1, the memory 134 is provided for storing first distortion correction data and second distortion correction data. The first distortion correction data is suitable for correcting a first optical distortion, e.g. an optical aberration, which is caused by the first optical system 108 when generating the first optical image of the first region 210 of the sample 104 in accordance with the wide-field imaging mode. Likewise, the second distortion correction data serves to correct a second optical distortion which is caused by the second optical system 112 when generating the second optical image of the second region 214 of the sample 104 in accordance with the confocal imaging mode. As the first and second optical systems 108, 112 use the different optical paths 116, 118 for imaging the respective region 210, 214, the optical distortions induced by the first and second optical systems 108, 112 are independent of each other. Hence, the first and second distortion correction data can be independently determined and stored in the memory 134.

Further, the memory 134 stores transformation data which can be used for correcting positional misalignment between the first and second optical images created in the wide-field imaging mode and the confocal imaging mode, respectively. Whereas the first and second distortion correction data can be independently assigned to each optical system 108, 112, the transformation data stored in the memory 134 reflects the positional relationship between the optical systems 108, 112.

The processor 124 utilizes the first and second distortion correction data as well as the transformation data stored in the memory 134 for providing a combined image which corresponds to the target region 242 of the object 104. This combined image provides image information derived from both wide-field imaging and the confocal imaging. In order to create the combined image, the processor generates first distortion corrected image data by processing first image data representing the first optical image based on the first distortion correction data. Likewise, the processor 124 generates second distortion corrected image data by processing second image data representing the second optical image based on the second distortion correction data. Then, based on the transformation data, the processor combines the first and second distortion correction image data in order to create combined image data which represent the combined image to be displayed on the display unit 138.

The optical imaging device 102 may provide a calibration mode in which the processor 124 generates the transformation data and stores this data in the memory 134. This calibration mode is preferably applied in the process of manufacturing and assembling the optical imaging device 102 so that it can be automatically used at a later stage when a user operates the microscope 100 for imaging the sample 104. The first and second distortion correction data independently assigned to the respective optical systems 108, 112 may be generated by the processor 124 in the calibration mode likewise.

For calibrating the optical imaging device 102 a reference object may be used. Just as an example, such a reference object may be formed by a grid 350 as illustrated in FIG. 3.

The grid 350 comprises a plurality of spots 352 which are provided in a rectangular array. The grid 350 is adapted to the first and second optical systems 108, 112 such that both optical systems 108, 112 are capable to image at least two of the spots 352 over an available magnification range of the microscope 100 despite the fact that the optical systems 108, 122 apply different imaging modes.

For the purpose of calibration, the first optical system 108 generates a first optical reference image of the grid 350 in the wide-field imaging mode. Correspondingly, the second optical system 112 generates a second optical reference image of the grid 350 in the confocal imaging mode. Subsequently, the processor 124 generates the first and second distortion correction data and stores the data in the memory 134. Furthermore, the processor determines a positional misalignment between the first and second reference images representing the grid 350. Based on this misalignment, the processor 124 generates the transformation data and stores the data in the memory 134.

Figure 3:
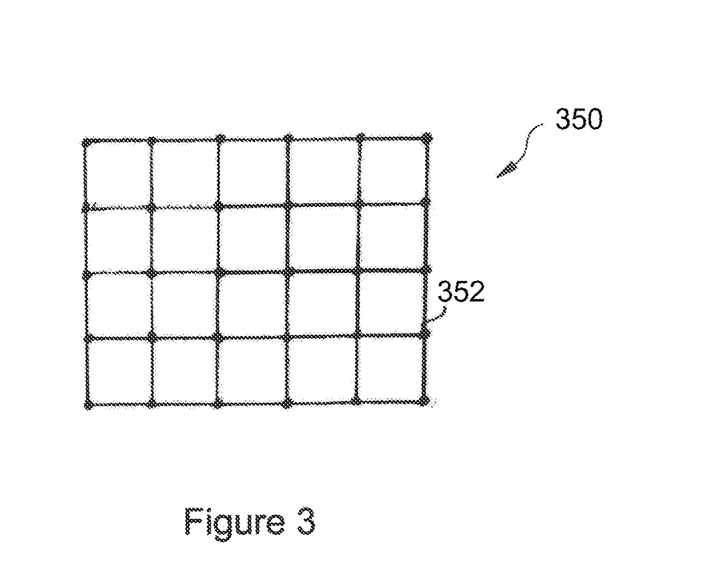
FIG. 3 is a diagram showing a reference object used for calibration according to an embodiment.
Figure 4:
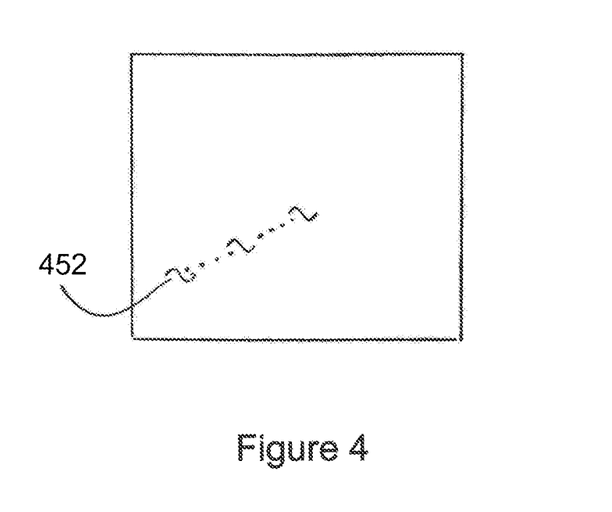
FIG. 4 is a diagram illustrating a tracking process for updating transformation data.

Using a reference object as shown in FIG. 3 for calibrating the optical imaging device 102 is to be understood merely as an example. Thus, the transformation data may also be generated based on live images which are created when the user operates the microscope 100 for imaging the sample 104. Further, live images may also be used in order to update the initial transformation data stored in the memory 134 in order to compensate for drift, structural modification, dynamic processes in the sample, etc. occurring during an experiment. For instance, the processor 124 may cause each of the optical systems 108, 112 to generate a sequence of optical images in accordance with the respective imaging mode. For each sequence, the processor determines a tracking mark 452 as illustrated in FIG. 4 within an initial image of this sequence and tracks the tracking mark 452 over time, i.e. over a plurality of images which are generated subsequent the initial image. Using the tracking mark 452, the processor 124 is enabled to generate updated transformation data for recalibrating the transformation without having to use a reference object as shown in FIG. 3.

In order to generate the transformation data, the processor 124 may be configured to determine correlation data which represents a correlation between the reference images. As explained above, images representing a reference object or live images may be used.

Figure 5:
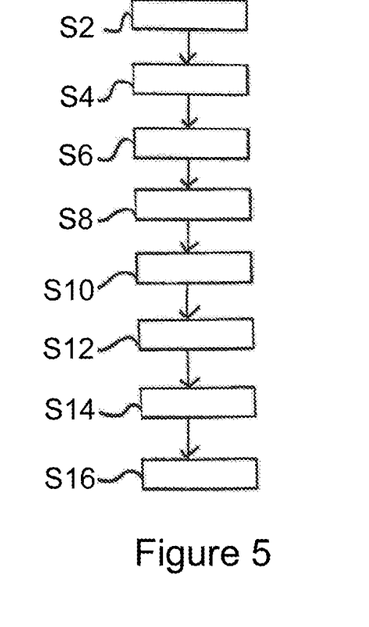
FIG. 5 is a flow diagram showing a method for calibrating the optical imaging device according to an embodiment.

The flow diagram of FIG. 5 illustrates a method for calibrating the optical imaging device 102 according to an embodiment.

In step S2, the first optical system 108 images a reference object as illustrated in FIG. 3 for forming a first reference image. Image data representing the first reference image may be stored in an image memory (not shown in the Figures). In step S4, the processor 124 determines the first distortion correction data e.g. by comparing digital data representing the first reference image with nominal data which have been defined in advance to correspond to an ideal reference image, i.e. to an image which would be generated without any optical distortion. In step S6, the processor 124 stores the first distortion correction data in the memory 134.

In step S8, the second optical system 112 forms a second reference image, and the processor 124 stores corresponding image data in the image memory. In step S10, the processor 124 determines the second distortion correction data. In step S12, the processor 124 stores the second distortion correction data in the memory 134. The steps S8, S10, and S12 for generating and storing the second distortion correction data are performed in the same manner as steps S2, S4, and S6 with respect to the first distortion correction data.

In step S14, the processor 124 determines the transformation data based on the first and second reference images as explained above. Finally, in step S16, the processor 124 stores the transformation data in the memory 134.

Figure 6:
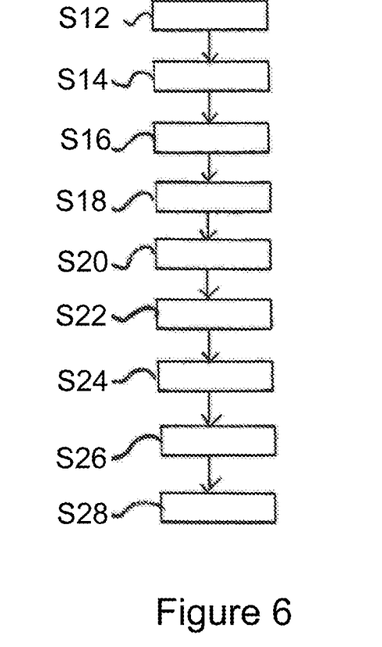
FIG. 6 is a flow diagram showing a method for imaging a sample using the microscope according to an embodiment.

The flow diagram shown in FIG. 6 illustrates a method for imaging the sample 104 according to an embodiment.

In step S12, the first optical system 108 forms the first optical image of the first target region 210 in accordance with the wide-field imaging mode. Correspondingly, in step 14, the second optical system 112 forms the second optical image of the second region 214 in accordance with the confocal imaging mode. As explained above with reference to FIG. 2, the first and second regions of the sample 104 spatially coincide in the target region 242. First and second image data representing the first and second optical images, respectively, are stored in the image memory in Steps 12 and 14.

After the first and second images have been generated, the processor 124 reads the first distortion correction data from the memory 134 in step S16. Likewise, in step S18, the processor 124 reads the second distortion correction data from the memory 134. In step S20, the processor 124 reads the transformation data from the memory 134.

In step S22, the processor 124 processes the first image data representing the first optical image based on the first distortion correction data in order to create first distortion corrected image data. Correspondingly, in step 24, the processor 124 processes the second image data representing the second optical image based on the second distortion correction data in order to create second distortion corrected image data. The first and second distortion corrected image data are stored in the image memory.

Finally, in step S26, the processor 124 combines the first and second distortion corrected image data using the transformation data read from the memory 134. Thus, combined image data are created which represent a combined image. The combined image corresponding to the target region 242 of the sample 104 may be displayed on the display unit 138. Further, the combined data may be stored in the image memory not shown in the Figures.

Figure 7:
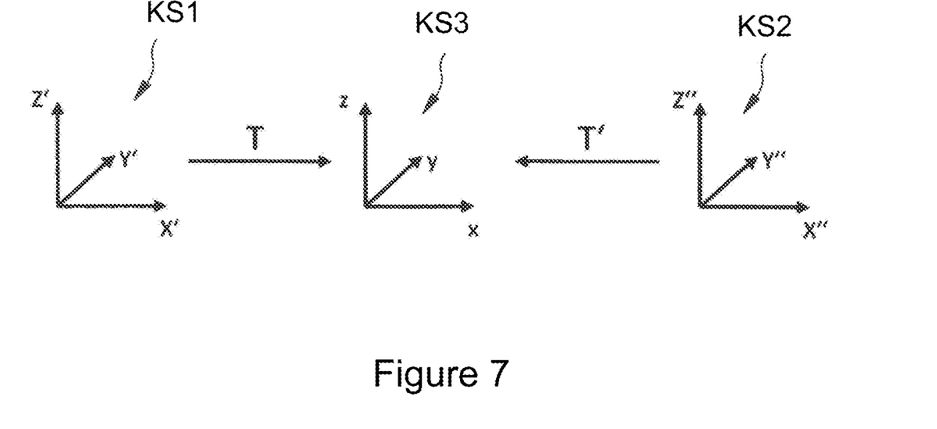
FIG. 7 is a diagram illustrating a transformation of coordinate systems assigned to first and second optical images, respectively, into a common reference coordinate system.

A specific transformation performed by the processor 124 for combining the first and second optical images is schematically illustrated in FIG. 7. According to the example of FIG. 7, the processor 124 uses two mapping operation T' and T" for transforming a first coordinate system KS1 assigned to the first image and a second coordinate system KS2 assigned to the second image into a third coordinate system KS3. The third coordinate system KS3 represents a common reference system which is assigned to the combined image formed from the first and second images.

Needless to say the transformation shown in FIG. 7 is merely an example. Thus, the processor 124 may combine the first and second distortion corrected image data based on the transformation data such that the first coordinate system KS1 is mapped into the second coordinate system KS2 or vice versa.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the disclosure can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the disclosure comprise a data carrier having electronically readable control signals, which are capable of cooperating with a programmable computer system, such that one of the methods described herein is performed.

Generally, embodiments of the present disclosure can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present disclosure is, therefore, a computer program having a program code for performing one of the methods described herein, when the computer program runs on a computer.

A further embodiment of the present disclosure is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present disclosure is an apparatus as described herein comprising a processor and the storage medium.

A further embodiment of the disclosure is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the disclosure comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

LIST OF REFERENCE SIGNS

100 microscope
102 optical imaging device 104 sample
106 microscope stage
108 first optical system
112 second optical system
116 optical path
118 optical path
120 image sensor
122 image sensor
124 processor
126 control line
128 control line
130 control line
132 control line
134 memory
136 control line
138 display unit
140 control line
142 light deflector
210 first region
214 second region
242 target region
350 grid
352 spots
452 tracking mark
KS1 first coordinate system
KS2 second coordinate system
KS3 third coordinate system
T transformation
T' transformation

What is claimed is:

1. An optical imaging device for a microscope, comprising:
a first optical system configured to form a first optical image corresponding to a first region of a sample in accordance with a first imaging mode, wherein said first imaging mode is a wide-field imaging mode;
a second optical system configured to form a second optical image corresponding to a second region of said sample in accordance with a second imaging mode, wherein said second imaging mode is a confocal imaging mode, wherein said first and second regions spatially coincide in a target region of said sample;
a memory storing first distortion correction data suitable for correcting a first optical distortion caused by said first optical system in said first optical image, second distortion correction data suitable for correcting a second optical distortion caused by said second optical system in said second optical image, and transformation data suitable for correcting positional misalignment between said first and second optical images, and
a processor which is configured to:
process first image data representing said first optical image based on said first distortion correction data for generating first distortion corrected image data,
process second image data representing said second optical image based on said second distortion correction data for generating second distortion corrected image data; and
combine said first and second distortion corrected image data based on said transformation data for generating combined image data representing a combined image which corresponds to said target region of said sample, wherein said combined image includes image information derived from both said wide-field imaging mode and said confocal imaging mode;
wherein said transformation data represents positional misalignment between a first optical reference image formed by said first optical system in accordance with said first imaging mode and a second optical reference image formed by said second optical system in accordance with said second imaging mode;
wherein said processor is configured to determine correlation data representing a correlation between said first and second optical reference images and to generate said transformation data based on said correlation data.

2. The optical imaging device according to claim 1, wherein a calibration mode is provided in which said processor is configured to generate said transformation data and to store said transformation data in said memory prior to forming said first and second optical images.

3. The optical imaging device according to claim 1, wherein the positional misalignment represented by the transformation data comprises translation, rotation, scaling, shearing, mirroring, and/or distortion.

4. The optical imaging device according to claim 1, wherein said processor is configured to update said transformation data and to store said updated transformation data in said memory.

5. The optical imaging device according to claim 4, wherein said processor is configured to cause said first optical system to generate a sequence of first optical images in accordance with said first imaging mode and to cause said second optical system to generate a sequence of second optical images in accordance with said second imaging mode,
wherein said processor is configured to determine a first tracking mark within one of said first optical images and to determine a second tracking mark within one of said second optical images, and
wherein said processor is configured to perform tracking of said first tracking mark and said second tracking mark and to update said transformation data based on said tracking.

6. The optical imaging device according to claim 1, wherein said processor is configured to combine said first and second distortion corrected image data based on said transformation data such that one of said first and second optical images is mapped to a reference system defined by the other of said first and second optical images or such that both optical images are mapped to a common reference system.

7. The optical imaging device according to claim 1, wherein said first and second optical systems are installed in a fixed positional relationship to each other.

8. A method for imaging a sample using a microscope, comprising the following steps:
forming, by the microscope, a first optical image corresponding to a first region of a sample in accordance with a first imaging mode using a first optical system, wherein said first imaging mode is a wide-field imaging mode;
forming, by the microscope, a second optical image corresponding to a second region of said sample in accordance with a second imaging mode using a second optical system, wherein said second imaging mode is a confocal imaging mode, wherein said first and second regions spatially coincide in a target region of said sample;
obtaining, from a memory, first distortion correction data suitable for correcting a first optical distortion caused by said first optical system in said first optical image;

obtaining, from the memory, second distortion correction data suitable for correcting a second optical distortion caused by said second optical system in said second optical image;

obtaining, from the memory, transformation data suitable for correcting positional misalignment between said first and second optical images;

processing, by a processor, first image data representing said first optical image based on said first distortion correction data for generating first distortion corrected image data;

processing, by the processor, second image data representing said second optical image based on said second distortion correction data for generating second distortion corrected image data; and combining, by the processor, said first and second distortion corrected image data based on said transformation data for generating combined image data representing a combined image which corresponds to said target region of said sample, wherein said combined image includes image information derived from both said wide-field imaging mode and said confocal imaging mode;

wherein said transformation data represents positional misalignment between a first optical reference image formed by said first optical system in accordance with said first imaging mode and a second optical reference image formed by said second optical system in accordance with said second imaging mode;

wherein said processor is configured to determine correlation data representing a correlation between said first and second optical reference images and to generate said transformation data based on said correlation data.

9. A method for calibrating an optical imaging device for a microscope, said optical imaging device comprising:

a first optical system configured to form a first optical image corresponding to a first region of a sample in accordance with a first imaging mode, wherein said first imaging mode is a wide-field imaging mode, a second optical system configured to form a second optical image corresponding to a second region of said sample in accordance with a second imaging mode, wherein said second imaging mode is a confocal imaging mode, wherein said first and second regions spatially coincide in a target region of said sample, a processor, and a memory, wherein said method includes following calibration steps:

obtaining first distortion correction data suitable for correcting a first optical distortion caused by said first optical system in said first optical image;

obtaining second distortion correction data suitable for correcting a second optical distortion caused by said second optical system in said second optical image;

obtaining transformation data suitable for correcting positional misalignment between said first and second optical images; and storing said first distortion correction data, said second distortion correction data and said transformation data in said memory to be accessible by said processor for generating a combined image including image information derived from both said wide-field imaging mode and said confocal imaging mode;

wherein said transformation data represents positional misalignment between a first optical reference image formed by said first optical system in accordance with said first imaging mode and a second optical reference image formed by said second optical system in accordance with said second imaging mode;

wherein said processor is configured to determine correlation data representing a correlation between said first and second optical reference images and to generate said transformation data based on said correlation data.

10. The method according to claim 9, wherein a first optical reference image of a reference object is formed using said first optical system in accordance with said first imaging mode, a second optical reference image of said reference object is formed using said second optical system in accordance with said second imaging mode, and said transformation data is determined based on positional misalignment of said first and second optical reference images.

11. The method according to claim 10, wherein said reference object comprises a grid formed by a plurality of spots, said grid being adapted to said first and second optical systems such that each of the first and second optical systems is capable of imaging at least two of said plurality of spots over a range of available magnifications.

12. A non-transitory computer-readable medium storing a computer program comprising instructions which, when the instructions are executed by a processor, cause the processor to perform the method according to claim 8.

* * * * *